(12) United States Patent
Nagaraj et al.

(10) Patent No.: US 9,034,479 B2
(45) Date of Patent: *May 19, 2015

(54) THERMAL BARRIER COATING SYSTEMS AND PROCESSES THEREFOR

(75) Inventors: Bangalore Aswatha Nagaraj, West Chester, OH (US); Douglas Gerard Konitzer, West Chester, OH (US); Julie Marie Chapman, Hamilton, OH (US); Venkat Subramaniam Venkataramani, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 79 days.

This patent is subject to a terminal disclaimer.

(21) Appl. No.: 13/542,057

(22) Filed: Jul. 5, 2012

(65) Prior Publication Data

US 2014/0220378 A1    Aug. 7, 2014

Related U.S. Application Data

(63) Continuation-in-part of application No. 13/341,247, filed on Dec. 30, 2011.

(60) Provisional application No. 61/546,793, filed on Oct. 13, 2011.

(51) Int. Cl.
*F01D 25/00* (2006.01)
*C04B 35/48* (2006.01)
(Continued)

(52) U.S. Cl.
CPC ....... *F01D 25/007* (2013.01); *Y10T 428/24967* (2015.01); *Y10T 428/12549* (2015.01);
(Continued)

(58) Field of Classification Search
None
See application file for complete search history.

(56) References Cited

U.S. PATENT DOCUMENTS 5,073,433 A    12/1991   Taylor
5,238,752 A    8/1993   Duderstadt et al.
(Continued)

FOREIGN PATENT DOCUMENTS

CN    1357642 A    7/2002
EP    0 605 196    7/1994
(Continued)

OTHER PUBLICATIONS

Winter et.al. Acta Materialia, 54, 2006, 5051-5059.*
(Continued)

*Primary Examiner* — Vera Katz
(74) *Attorney, Agent, or Firm* — General Electric Company; Pamela A. Kachur

(57) ABSTRACT

Coating systems and processes by which the coating systems can be deposited to be resistant to contaminants, and particularly resistant to infiltration and damage caused by CMAS. The coating systems include inner and outer ceramic layers. The inner ceramic layer consists essentially of zirconia stabilized by about 6 to about 9 weight percent yttria and optionally contains greater than 0.5 to 10 weight percent hafnium oxide. The outer ceramic layer overlies and contacts the inner ceramic layer to define the outermost surface of the coating system. The outer ceramic layer consists essentially of zirconia stabilized by about 25 to about 75 weight percent yttria, has a thickness that is less than the thickness of the inner ceramic layer and further contains greater than 0.5 to 10 weight percent hafnium oxide and optionally 1 to 10 weight percent tantalum oxide. The outer ceramic layer has a porosity level that is lower than that of the inner ceramic layer.

13 Claims, 4 Drawing Sheets

(51) Int. Cl.
  *F01D 5/28* (2006.01)
  *C23C 4/10* (2006.01)
  *C23C 4/18* (2006.01)
  *C23C 30/00* (2006.01)

(52) U.S. Cl.
  CPC .......... *Y10T428/2495* (2015.01); *C23C 4/105* (2013.01); *C23C 4/18* (2013.01); *C23C 30/00* (2013.01); *C04B 35/48* (2013.01); *F01D 5/284* (2013.01); *F01D 5/288* (2013.01)

(56) References Cited

U.S. PATENT DOCUMENTS

| | | | |
|---|---|---|---|
| 5,520,516 A | 5/1996 | Taylor et al. | |
| 5,652,044 A | 7/1997 | Rickerby | |
| 5,660,885 A | 8/1997 | Hasz et al. | |
| 5,830,586 A | 11/1998 | Gray et al. | |
| 5,897,921 A | 4/1999 | Borom et al. | |
| 5,989,343 A | 11/1999 | Borom et al. | |
| 6,025,078 A | 2/2000 | Rickerby et al. | |
| 6,047,359 A | 4/2000 | Fouts | |
| 6,047,539 A | 4/2000 | Farmer | |
| 6,071,627 A | 6/2000 | Yasuda et al. | |
| 6,102,656 A | 8/2000 | Nissley et al. | |
| 6,482,537 B1 | 11/2002 | Strangman et al. | |
| 6,764,779 B1 | 7/2004 | Liu et al. | |
| 6,890,668 B2 | 5/2005 | Bruce et al. | |
| 6,930,066 B2 | 8/2005 | Subramanian | |
| 6,982,126 B2 | 1/2006 | Darolia et al. | |
| 7,291,403 B2 | 11/2007 | Nagaraj et al. | |
| 7,862,901 B2 | 1/2011 | Darolia et al. | |
| 7,875,370 B2 | 1/2011 | Schlichting et al. | |
| 8,080,283 B2 | 12/2011 | Schlichting et al. | |
| 8,216,689 B2 | 7/2012 | Witz et al. | |
| 8,460,799 B2 | 6/2013 | Arikawa et al. | |
| 2005/0118334 A1 | 6/2005 | Gorman et al. | |
| 2005/0271886 A1 | 12/2005 | Cetel | |
| 2006/0093850 A1 | 5/2006 | Darolia et al. | |
| 2007/0160859 A1 | 7/2007 | Darolia et al. | |
| 2008/0057326 A1 | 3/2008 | Schlichting et al. | |
| 2008/0145674 A1* | 6/2008 | Darolia et al. | 428/433 |
| 2009/0162690 A1 | 6/2009 | Nagaraj et al. | |
| 2009/0162692 A1 | 6/2009 | Nagaraj et al. | |
| 2010/0154422 A1* | 6/2010 | Kirby et al. | 60/722 |
| 2011/0003119 A1* | 1/2011 | Doesburg et al. | 428/155 |
| 2011/0033284 A1 | 2/2011 | Tryon et al. | |
| 2011/0086179 A1 | 4/2011 | Schlichting et al. | |
| 2011/0171488 A1 | 7/2011 | Taylor | |
| 2011/0300357 A1 | 12/2011 | Witz et al. | |
| 2012/0034471 A1 | 2/2012 | Peterson | |
| 2012/0122651 A1 | 5/2012 | Taylor et al. | |
| 2013/0095344 A1* | 4/2013 | Nagaraj et al. | 428/623 |
| 2013/0130052 A1 | 5/2013 | Menuey et al. | |
| 2013/0224457 A1 | 8/2013 | Lee | |
| 2013/0295326 A1* | 11/2013 | Doesburg et al. | 428/138 |

FOREIGN PATENT DOCUMENTS

| | | | |
|---|---|---|---|
| EP | 1683775 | A2 | 7/2006 |
| EP | 1731630 | A2 | 12/2006 |
| EP | 1811060 | A2 | 7/2007 |
| JP | 2007182631 | A | 7/2007 |
| JP | 2009286127 | A | 12/2009 |
| JP | 2010229471 | A | 10/2010 |
| JP | 2011012287 | A | 1/2011 |
| JP | 2011510167 | A | 3/2011 |
| JP | 2011512454 | A | 4/2011 |
| JP | 2011167994 | A | 9/2011 |
| JP | 2012512330 | A | 5/2012 |
| JP | 2013522462 | A | 6/2013 |
| JP | 2013540887 | A | 11/2013 |

OTHER PUBLICATIONS

Haynes et.al. Surface and Coating Technology, 86-87, 1996, 102-108.*
Ibegazene et al. Journal of Materials Science, 30, 1995, 938-951.*
Chen et.al. Solid State Ionics, 170, 2004, 255-274.*
Matsumoto et.al. Surface and Surface Technology, 203, 2009, 2835-2840.*
S. Ahmaniemi, P. Vuoristo, T. Mantyla, "Improved sealing treatments for thick thermal barrier coatings", Institute of Materials Science, Tampere University of Technology, Tampere, Finland, Surface and Coatings Technology, 151-152 (2002) 412-417.
Search Report and Written Opinion from corresponding PCT Application No. PCT/US2012/059841, dated Jul. 24, 2013.
Non-Final Rejection towards corresponding U.S. Appl. No. 13/341,247 dated Jan. 6, 2014.
Final Rejection towards corresponding U.S. Appl. No. 13/341,247 dated May 28, 2014.
Unofficial English translation of Office Action issued in connection with corresponding CN Application No. 201280050181.8 on Dec. 25, 2014.
Unofficial English Translation of Japanese Office Action issued in connection with corresponding JP Application No. 2014-535892 on Jan. 27, 2015.

* cited by examiner

THERMAL BARRIER COATING SYSTEMS AND PROCESSES THEREFOR

CROSS REFERENCE TO RELATED APPLICATIONS

This is a continuation-in-part patent application of co-pending U.S. patent application Ser. No. 13/341,247, filed Dec. 30, 2011, which claims the benefit of U.S. Provisional Application No. 61/546,793, filed Oct. 13, 2011. The contents of these prior applications are incorporated herein by reference.

BACKGROUND OF THE INVENTION

This invention relates to coatings capable of use on components exposed to high temperatures, such as the hostile thermal environment of a gas turbine engine. More particularly, this invention is directed to a thermal barrier coating (TBC) capable of exhibiting resistance to thermal cycling and infiltration by contaminants, for example, of types that may be present in the operating environment of a gas turbine engine.

The use of thermal barrier coatings (TBCs) on components such as combustors, high pressure turbine (HPT) blades, vanes and shrouds is increasing in commercial as well as military gas turbine engines. The thermal insulation provided by a TBC enables such components to survive higher operating temperatures, increases component durability, and improves engine reliability. TBCs are typically formed of a ceramic material and deposited on an environmentally-protective bond coat to form what is termed a TBC system. Bond coat materials widely used in TBC systems include oxidation-resistant overlay coatings such as MCrAlX (where M is iron, cobalt and/or nickel, and X is yttrium or another rare earth element), and diffusion coatings such as diffusion aluminides that contain aluminum intermetallics. Bond coat materials are typically selected to be capable of forming a continuous and adherent oxide scale on their surface to promote the adhesion of the ceramic coating to the bond coat. The oxide scale can be formed by subjecting the bond coat to an oxidizing environment, such that the scale is sometimes referred to as a thermally-grown oxide (TGO).

Notable examples of ceramic materials for TBCs include zirconia partially or fully stabilized with yttria (yttrium oxide; $Y_2O_3$) or another oxide, such as magnesia, ceria, scandia and/or calcia, and optionally other oxides to reduce thermal conductivity. Binary yttria-stabilized zirconia (YSZ) is widely used as a TBC material because of its high temperature capability, low thermal conductivity, and relative ease of deposition. Zirconia is stabilized to inhibit a tetragonal to monoclinic crystal phase transformation at about 1000° C., which results in a volume change that can cause spallation. At room temperature, the more stable tetragonal phase is obtained and the monoclinic phase is minimized if zirconia is stabilized by at least about six weight percent yttria. A stabilizer (e.g., yttria) content of seventeen weight percent or more ensures a fully stable cubic crystal phase. The conventional practice has been to partially stabilize zirconia with six to eight weight percent yttria (6-8% YSZ) to obtain a TBC that is adherent and spallation-resistant when subjected to high temperature thermal cycling. Furthermore, partially stabilized YSZ (e.g., 6-8% YSZ) is known to be more erosion-resistant than fully stabilized YSZ (e.g., 20% YSZ).

Various process can be used to deposit TBC materials, including thermal spray processes such as air plasma spraying (APS), vacuum plasma spraying (VPS), low pressure plasma spraying (LPPS), and high velocity oxy-fuel (HVOF). TBCs employed in the highest temperature regions of gas turbine engines are often deposited by a physical vapor deposition (PVD), and particularly electron beam physical vapor deposition (EBPVD), which yields a columnar, strain-tolerant grain structure that is able to expand and contract without causing damaging stresses that lead to spallation. Similar columnar microstructures can be produced using other atomic and molecular vapor processes, such as sputtering (e.g., high and low pressure, standard or collimated plume), ion plasma/cathodic arc deposition, and all forms of melting and evaporation deposition processes (e.g., laser melting, etc.). TBCs formed by the various methods noted above generally have a lower thermal conductivity than a dense ceramic of the same composition as a result of the presence of microstructural defects and pores at and between grain boundaries of the TBC microstructure.

Under service conditions, hot section engine components protected by a TBC system can be susceptible to various modes of damage, including erosion, oxidation and corrosion from exposure to the gaseous products of combustion, foreign object damage (FOD), and attack from environmental contaminants. The source of environmental contaminants is ambient air, which is drawn in by the engine for cooling and combustion. The type of environmental contaminants in ambient air will vary from location to location, but can be of a concern to aircraft as their purpose is to move from location to location. Environmental contaminants that can be present in the air include sand, dirt, volcanic ash, sulfur in the form of sulfur dioxide, fly ash, particles of cement, runway dust, and other pollutants that may be expelled into the atmosphere, such as metallic particulates, for example, magnesium, calcium, aluminum, silicon, chromium, nickel, iron, barium, titanium, alkali metals and compounds thereof, including oxides, carbonates, phosphates, salts and mixtures thereof. These environmental contaminants are in addition to the corrosive and oxidative contaminants that result from the combustion of fuel. However, all of these contaminants can adhere to the surfaces of the hot section components, including those that are protected with a TBC system.

In order for a TBC to remain effective throughout the planned life cycle of the component it protects, it is important that the TBC has and maintains integrity throughout the life of the component, including when exposed to contaminants. Some contaminants may result in TBC loss over the life of the components. For example, particulates of calcia (CaO), magnesia (MgO), alumina (aluminum oxide; $Al_2O_3$) and silica (silicon dioxide; $SiO_2$) are often present in environments containing fine sand and/or dust. When present together at elevated temperatures, calcia, magnesia, alumina and silica can form a eutectic compound referred to herein as CMAS. A particular composition that has been identified for CMAS contains about 35 mol % CaO, about 10 mol % MgO, about 7 mol % $Al_2O_3$, and about 48 mol % $SiO_2$, along with about 3 mol % $Fe_2O_3$ and about 1.5 mol % NiO. CMAS has a relatively low melting temperature, such that during turbine operation the CMAS that deposits on a component surface can melt, particularly if surface temperatures exceed about 2240° F. (1227° C.). Molten CMAS is capable of infiltrating the porosity within TBCs. For example, CMAS is capable of infiltrating into TBCs having columnar structures, dense vertically-cracked TBCs, and the horizontal splat boundaries of TBCs deposited by thermal and plasma spraying. The molten CMAS resolidifies within cooler subsurface regions of the TBC, where it interferes with the compliance of the TBC and can lead to spallation and degradation of the TBC, particularly during thermal cycling as a result of interfering with the ability of the TBC to expand and contract. In addition to loss of compliance, deleterious chemical reactions with yttria and zirconia within the TBC, as well as with the thermally-grown oxide at the bond coating/TBC interface, can occur and cause degradation of the TBC system. Once the passive thermal barrier protection provided by the TBC has been lost, continued operation of the engine will lead to oxidation of the base metal beneath the TBC system, which may ultimate lead to failure of the component by burn through cracking.

Attempts to mitigate the effect of the CMAS on high pressure turbine blades and shrouds have included the application of a thin layer of alumina on the surface of the TBC to increase the melting point of CMAS by about 100 to 150° F. (38° C. to 66° C.), for example, as reported in U.S. Pat. No. 5,660,885. The addition of the alumina layer provides an increase in operating temperature of up to about 2400° F. (1316° C.) with reduced infiltration of liquid CMAS. However, grinding during manufacture and assembly, as well as grinding and rubbing with turbine shrouds during gas turbine engine operation, result in the use and reliance on the alumina layer difficult and impractical. In addition, the alumina layer adds manufacturing cost and complexity, especially for turbine blades that are subjected to gas and particle erosion and may have different requirements for the alumina coating in order to minimize erosion. In addition, thicker alumina layers are subject to coefficient of thermal expansion mismatches within the TBC coating system, resulting in thermal strains during cycling.

In view of the above, it can be appreciated that there are certain problems, shortcomings or disadvantages associated with the prior art, and that it would be desirable if systems and methods were available that are capable of promoting the resistance of components to contaminants, such as CMAS, and particularly gas turbine engine components that operate at temperatures above the melting temperatures of contaminants.

BRIEF DESCRIPTION OF THE INVENTION

The present invention provides a coating system and a process by which the coating system can be deposited to be resistant to contaminants, and particularly resistant to infiltration and damage caused by CMAS.

According to a first aspect of the invention, a coating system is provided on a surface region of a component. The coating system includes a bond coat and inner and outer ceramic layers overlying the bond coat. The inner ceramic layer overlies the bond coat, consists essentially of zirconia stabilized by about 6 to about 9 weight percent yttria and optionally contains greater than 0.5 to 10 weight percent hafnium oxide, and has a thickness and porosity level. The outer ceramic layer overlies and contacts the inner ceramic layer to define the outermost surface of the coating system. The outer ceramic layer consists essentially of zirconia stabilized by about 25 to about 75 weight percent yttria and further contains greater than 0.5 to 10 weight percent hafnium oxide and optionally 1 to 10 weight percent tantalum oxide. The outer ceramic layer has a thickness that is less than the thickness of the inner ceramic layer, and has a porosity level that is lower than the inner ceramic layer.

According to a second aspect of the invention, a process is provided for forming a coating system on a component. The process includes depositing a bond coat on a surface of the component, depositing an inner ceramic layer on the bond coat, and then depositing an outer ceramic layer on the inner ceramic layer to define an outermost surface of the coating system. The inner ceramic layer consists essentially of zirconia stabilized by about 6 to about 9 weight percent yttria and optionally contains greater than 0.5 to 10 weight percent hafnium oxide, and is deposited to have a thickness and a porosity level. The outer ceramic layer consists essentially of zirconia stabilized by about 25 to about 75 weight percent yttria and further contains greater than 0.5 to 10 weight percent hafnium oxide and optionally 1 to 10 weight percent tantalum oxide. The outer ceramic layer is deposited to have a thickness that is less than the thickness of the inner ceramic layer and a porosity level that is lower than the inner ceramic layer. The inner and outer ceramic layers are then heat treated to a temperature and a duration sufficient to relieve stresses therein induced by the depositing steps.

A technical effect of the invention is the ability of the coating system to withstand thermal cycling when subjected to CMAS contaminants. The high yttria content of the outer ceramic layer enables the outer ceramic layer to react with CMAS to form a protective layer that inhibits further infiltration of molten CMAS into the coating system. The effectiveness of the coating system is enhanced through the incorporation of hafnium oxide in at least its high-yttria outer ceramic layer. By substituting hafnium oxide for zirconia in the yttria-zirconia system of at least the outer ceramic layer, the thermal conductivity of the coating system can be reduced. Hafnium oxide also serves to increase the melting point of zirconia and improves the sintering resistance of zirconia. In addition, hafnium oxide is believed to serve as a nucleating agent to catalyze the devitrification of amorphous CMAS by dissolution into the glass, thereby providing sites for nucleation and promoting the precipitation of crystalline CMAS that is less harmful to the coating system than amorphous CMAS. Hafnium oxide can also serve as a nucleating agent for the precipitation of a protective reaction product that contains calcium yttrium silicate (often known as an apatite phase). An additional advantage of hafnium oxide is it can mitigate glass formation of CMAS via precipitation of crystalline calcium hafnate.

Significantly, the relative thicknesses and densities of the inner and outer ceramic layers have also been shown to be critical to the spallation resistance of the coating system. In particular, the spallation resistance of the coating system has been shown to be significantly enhanced by limiting the thickness of the outer ceramic layer relative to the thickness of the inner ceramic layer and by ensuring that the outer ceramic layer is denser (less porous) than the inner ceramic layer.

Other aspects and advantages of this invention will be better appreciated from the following detailed description.

DETAILED DESCRIPTION OF THE INVENTION

The present invention is generally applicable to components subjected to high temperatures, and particularly to components such as the high and low pressure turbine vanes (nozzles) and blades (buckets), shrouds, combustor liners and augmentor hardware of gas turbine engines. The invention provides TBC systems that are suitable for protecting the surfaces of gas turbine engine components that are subjected to hot combustion gases. While the advantages of this invention will be described with reference to gas turbine engine components, the teachings of the invention are generally applicable to any component on which a TBC may be used to protect the component from a high temperature environment.

Figure 1:
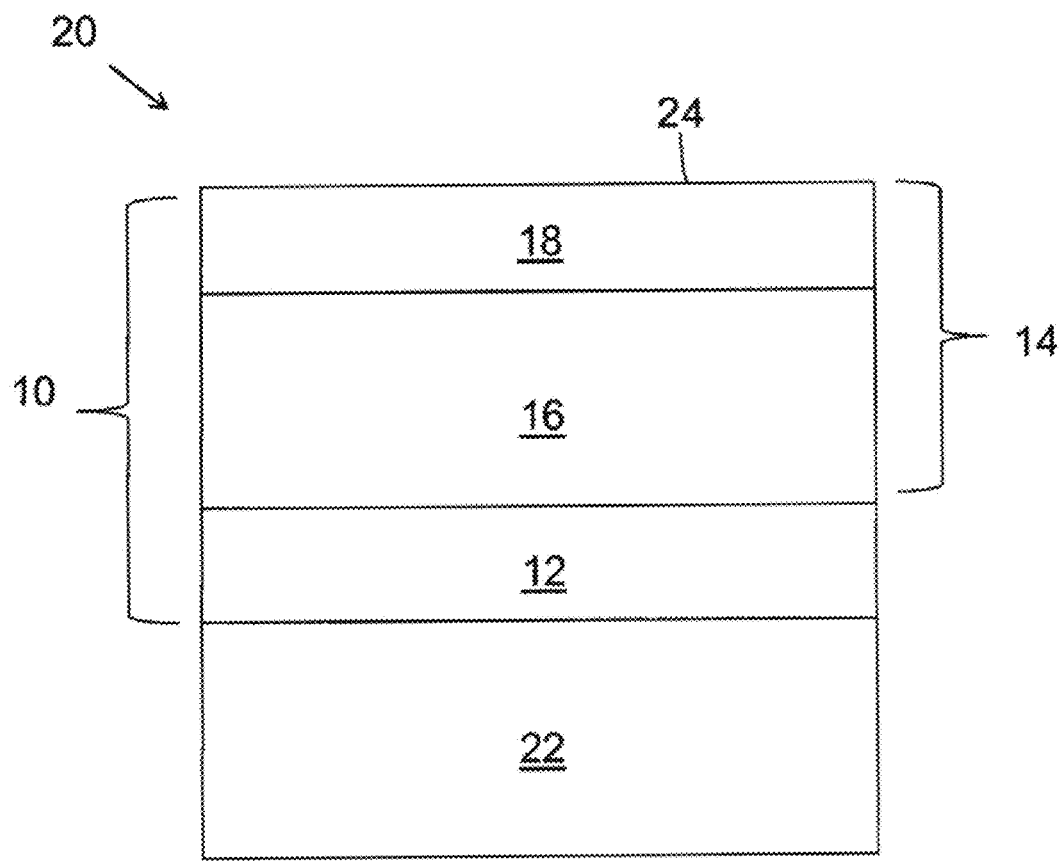
FIG. 1 schematically represents a cross-section through a TBC system.

An embodiment of a TBC system 10 of this invention is schematically represented in FIG. 1 as being applied to the surface of a substrate 22, which in combination with the TBC system 10 yields a coated component 20. The TBC system 10 is shown as including a bond coat 12 that overlies the surface of a substrate 22, the latter of which may be a superalloy or another high temperature material. The substrate 22 is typically the base material of the component 20 protected by the TBC system 10, though the substrate 22 may instead be a coating on the component. The bond coat 12 may be an aluminum-rich composition of a type typically used with TBC systems for gas turbine engine components, such as an overlay coating of an MCrAlX alloy or a diffusion coating such as a diffusion aluminide (including diffusion aluminide coatings modified by a precious metal, for example, platinum) of a type known in the art. A particular example is a NiCrAlY composition of a type known in the art. A suitable thickness for the bond coat 12 is about 0.007 inch (about 175 micrometers), though lesser and greater thicknesses are foreseeable as long as the bond coat 12 is capable of providing the desired functions of protecting the substrate 22 and anchoring the TBC system 10. Aluminum-rich bond coats of the types noted above develop an aluminum oxide (alumina) scale (not shown), which is thermally grown by oxidation of the bond coat 12.

Also shown in FIG. 1 is a multilayer TBC 14 overlying the bond coat 12. The TBC 14 comprises an inner TBC layer 16 that has been deposited directly on the bond coat 12 so as to overlie the bond coat 12, and an outer TBC layer 18 that has been deposited directly on the inner TBC layer 16 so as to overlie the inner TBC layer 16 and define the outermost surface 24 of the TBC system 10 and component 20. As such, if the component 20 is subjected to contaminants, the contaminants would be deposited directly onto the surface 24 of the outer TBC layer 18.

According to a preferred aspect of the invention, the inner and outer TBC layers 16 and 18 are formed of YSZ materials having different yttria contents. The yttria content of the outer TBC layer 18 of the TBC 14 is higher than the yttria content on the inner TBC layer 16, and is sufficiently high to promote the ability of the outer TBC layer 18 to react with contaminants that may deposit on the outermost surface 24 of the TBC system 10. A contaminant of particular concern is the aforementioned CMAS, in which case the yttria content of the outer TBC layer 18 is able to react with molten CMAS deposits at temperatures above about 1200° C. (about 2200° F.) to form a protective reaction product that contains calcium yttrium silicate, which is often known as an apatite phase. The reaction product forms a dense adherent sealing layer that protects the underlying TBC system 10 from further infiltration of CMAS. Though the resistance to CMAS infiltration of a YSZ layer containing more than 20 weight percent yttria is taught in U.S. Pat. No. 7,862,901 to Darolia et al., TBC systems within the ranges taught by Darolia et al. were found to be prone to spallation. The present invention is based on the determination that spallation resistance is achieved by more narrowly limiting the yttria content and, in particular, by controlling the relative thicknesses and densities of the inner and outer TBC layers 16 and 18, as discussed below.

Figure 2:
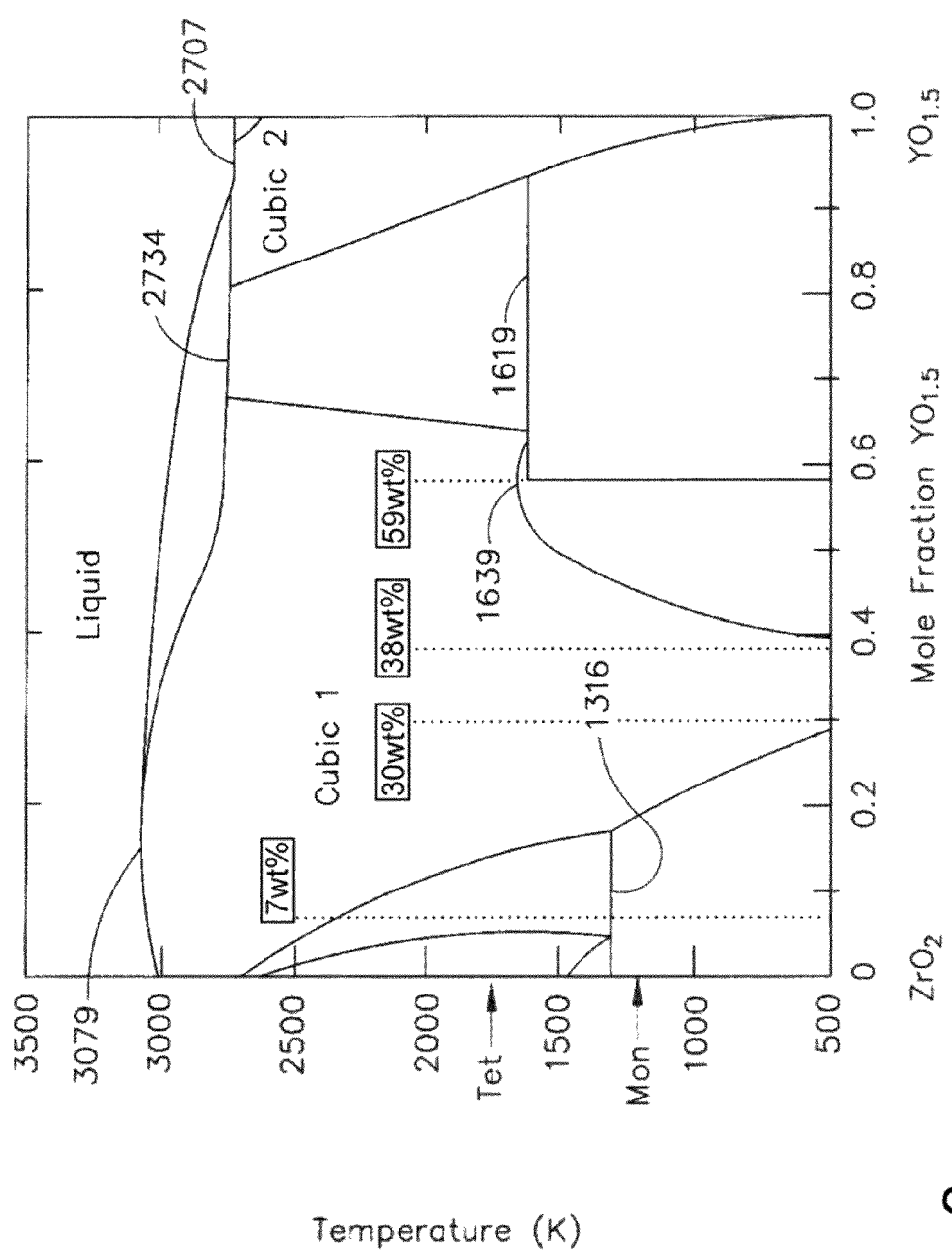
FIG. 2 is a phase diagram for the zirconia-yttria system.

According to preferred aspects of the invention, the outer TBC layer 18 contains about 25 to about 75 wt. % yttria, with the balance being essentially zirconia (allowing for incidental impurities). More preferably, the outer TBC layer 18 contains 30 to 59 wt. % and preferably less than 55 wt. % yttria, with an yttria content of 36 to 42 wt % appearing to be particularly sufficient to enable the reaction that forms the desired calcium yttrium silicate reaction product while offering greater erosion and spallation resistance than higher yttria contents. In contrast, the inner TBC layer 16 has a lower yttria content, and can contain a generally conventional yttria content of about 6 to about 9 wt % yttria, with the balance being essentially zirconia (allowing for incidental impurities). As evident from FIG. 2, the phase diagram for the yttria-zirconia system shows the composition of the inner TBC layer 16 as falling within the metastable tetragonal (or modified tetragonal) phase field, whereas the range of 30 to 59 wt. % yttria preferred for the outer TBC layer 18 lies entirely within the cubic phase field.

As noted above, the outer TBC layer 18 also differs from the inner TBC layer 16 in terms of its density (porosity) and thickness. In particular, the inner TBC layer 16 is deposited in a manner that achieves a relatively porous macrostructure, preferably characterized by a porosity level of about 10 to about 25 volume percent, and more preferably about 10 to about 20 volume percent. In contrast, the outer TBC layer 18 is deposited in a manner that achieves a less porous macrostructure than the inner TBC layer 16. The outer TBC layer 18 preferably has a porosity level of about 3 to about 15 volume percent, and more preferably about 5 to about 10 volume percent. The preferred density range and the relatively higher density of the outer TBC layer 18 is necessary in view of the lower toughness and erosion resistance of the cubic YSZ phase within this layer 18 as compared to the tetragonal YSZ phase within the inner TBC layer 16.

To obtain the desire porosity levels in the TBC layers 16 and 18, the TBC layers 16 and 18 preferably have a noncolumnar structure as a result of being deposited by a thermal spraying technique, for example, plasma spraying (air (APS), vacuum (VPS) and low pressure (LPPS)) or high velocity oxy-fuel (HVOF). As known in the art, thermal spraying involves propelling melted or at least heat-softened particles of a heat fusible material (e.g., metal, ceramic) against a surface, where the particles are quenched and bond to the surface to produce a coating. As such, the inner and outer TBC layers 16 and 18 are deposited in the form of molten "splats," resulting in a microstructure characterized by horizontal porosity resulting from the presence of the splats (flattened grains). The microstructures of either or both TBC layers 16 and 18 may be modified to contain dense vertical cracks of the type taught in U.S. Pat. Nos. 5,073,433, 5,520,516, 5,830, 586, 5,897,921, 5,989,343 and 6,047,539. It is also within the scope of the invention that the inner and/or outer TBC layers 16 and 18 could be deposited using other deposition processes, nonlimiting examples of which include physical vapor deposition processes, solution plasma spray processes, suspension plasma processes, high velocity air fuel thermal spray processes, and high velocity oxy fuel thermal spray processes.

The inner and outer TBC layers 16 and 18 and the bond coat 12 may be deposited using the same thermal spray gun. Particular acceptable results, including the desired difference in the densities of the TBC layers 16 and 18, have been obtained by controlling the surface temperatures and varying the standoff distances used to deposit the TBC layers 16 and 18. Particularly suitable results have been obtained by depositing the bond coat 12 and inner TBC layer 16 using relatively conventional plasma spray conditions including a standoff distance of about 4.5 to about 5 inches (about 11.4 to about 12.7 cm) and using sweeping air while maintaining the surface temperature of the bond coat 12 at about 75 to about 200° F. (about 24 to about 93° C.). In addition, particularly suitable results have been obtained by depositing the outer TBC layer 18 using a shorter standoff distance than used to deposit the inner TBC layer 16, for example, about 3 to about 3.25 inch (about 7.6 to about 8.3 cm) using sweeping air while maintaining the deposition surface of the inner TBC layer 16 at a higher temperature than used to deposit the inner TBC layer 16, for example, about 450 to about 550° F. (about 230 to about 260° C.). In other words, the outer TBC layer 18 may be applied using the same thermal spray gun as used to deposit the inner TBC layer 16, but the TBC layer 18 is deposited on a hotter and closer substrate surface than the TBC layer 16. The combined effect of these parameters is to intentionally decrease the porosity of the outer TBC layer 18 relative to the inner TBC layer 16.

Figure 3:
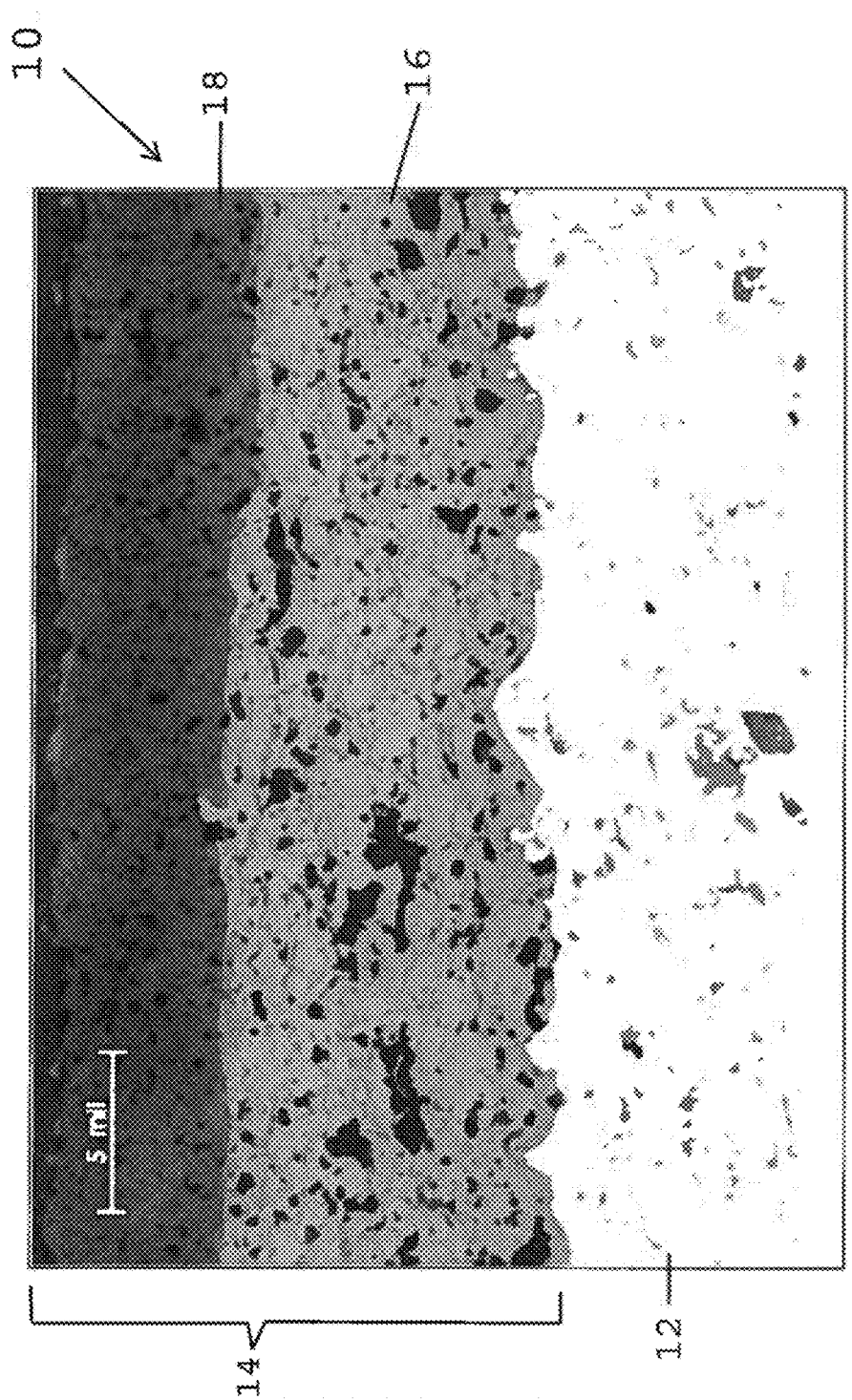
FIG. 3 is a scanned images of a TBC system in accordance with an embodiment of this invention.

FIG. 3 shows a nonlimiting example of a TBC system containing a bond coat and two TBC layers of the types described above. The bond coat appears as the lightest layer in the image, and the outer TBC layer appears as the darkest layer in the image.

Following the deposition of both TBC layers 16 and 18, the TBC system 10 preferably undergoes heat treatment to relieve residual stresses. An exemplary heat treatment is in a temperature range of about 1925 to about 1975° F. (about 1050 to about 1080° C.) in a vacuum for a duration of about two to about four hours. A particularly preferred heat treatment is believed to be about 1975° F. (about 1080° C.) in a vacuum for about four hours. This disclosed heat treatment is merely exemplary and other effective heat treatments may be employed.

Figure 4:
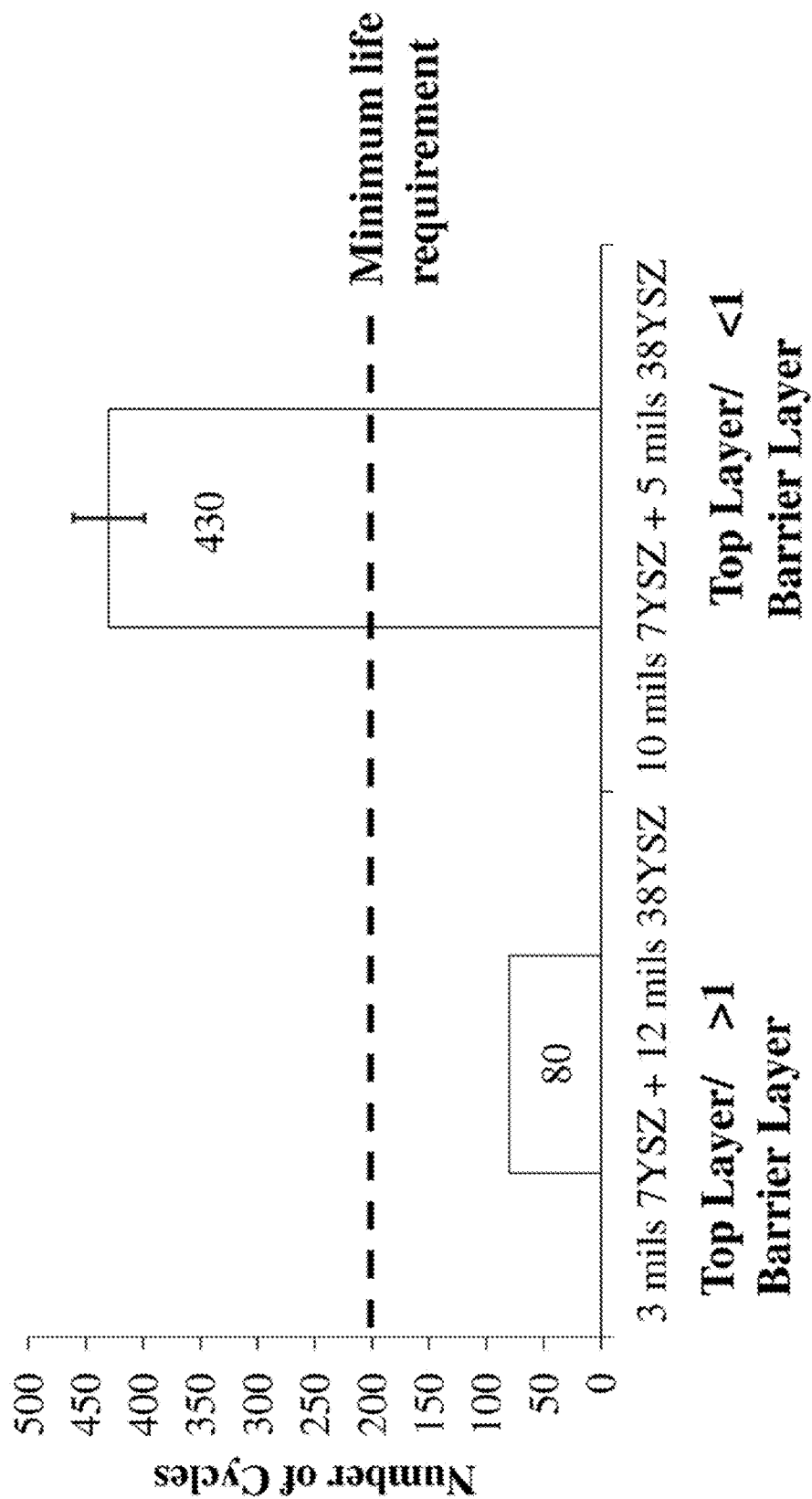
FIG. 4 is a graph comparing the relative resistance of TBC systems within and outside the scope of the invention to thermal cycling when subjected to CMAS contamination.

As noted above, the outer TBC layer 18 also differs from the inner TBC layer 16 in terms of its thickness. Investigations leading to the present invention evidenced that the relative thickness of the TBC layers 16 and 18 must be controlled in order to achieve improvements in spallation resistance of the TBC system 10, even in the absence of CMAS contaminants. In particular, testing indicated that the thickness ratio of the outer TBC layer 18 to the inner TBC layer 16 must be less than one. FIG. 4 represents data accumulated from furnace cycle testing performed under conditions that entailed one-hour cycles between room temperature and about 2075° F. (about 1135° C.), with a dwell time of about forty-five minutes at peak temperature. Testing of a specimen was terminated when about 20% of the surface area of the TBC system had spalled. Two sets of specimens were evaluated, each deposited on substrates formed of René N5 and provided with a bond coat formed of NiCrAlY. A first set of the specimens had an inner TBC layer of about 7% YSZ that was about 3 mils thick (about 75 micrometers) and an outer TBC layer of about 38% YSZ that was about 12 mils thick (about 300 micrometers). The second set of specimens had an inner TBC layer of about 7% YSZ that was about 10 mils thick (about 250 micrometers) and an outer TBC layer of about 38% YSZ that was about 5 mils thick (about 125 micrometers). The TBC layers were deposited using plasma spray parameters previously described for the inner and outer TBC layers 16 and 18 of this invention. As evident from FIG. 4, the second set of specimens demonstrated longer TBC lives than the first set of specimens. In particular, the specimens with a thickness ratio of less than one (about 0.5) exhibited furnace cycle lives of greater than five times greater than the specimens with a thickness ratio of greater than one (about 4).

From these tests, it was shown that, in addition to the compositional and porosity differences between the inner and outer TBC layers 16 and 18, it is important that their thickness ratio (outer/inner) is not greater than one. From these tests, it was further concluded that preferred thickness ratios are less than one, with ratios of not greater than 0.5 believed to be particularly preferred. The individual thicknesses of the TBC layers 16 and 18 can be varied to achieve the desired ratio. For example, the inner TBC layer 16 may have a thickness of 50 micrometers up to about 500, for example, a nominal thickness of about 250 micrometers, and the outer TBC layer 18 may have a thickness of 25 micrometers up to about 250, for example, a nominal thickness of about 125 micrometers.

From the above, it should be appreciated that the characteristics of the outer TBC layer 18, specifically, a higher yttria content, greater density (less porosity), and lesser thickness relative to the inner TBC layer 16, enable the TBC system 10 to not only mitigate the deleterious effects of CMAS deposits, but also exhibit acceptable thermal cycling lives. As such, the TBC system 10 is particularly well suited for protecting hot section components of gas turbine engines, and is capable of enabling such components to operate for longer durations and/or at higher temperatures.

Additionally, several characteristics of the TBC system 10 can be improved by the incorporation of hafnium oxide (hafnia; $HfO_2$) into the yttria-zirconia system of at least the outer TBC layer 18. These characteristics include thermal conductivity reduction, sintering rate reduction, and catalyzation of crystalline CMAS. Hafnium oxide in amounts of greater than 0.5 weight percent, more preferably greater than 1.0 weight percent, is believed to have a significant effect on these characteristics. Hafnium oxide increases phonon scattering in the yttria-zirconia system, therefore decreasing thermal conductivity. Hafnium oxide also reduces the oxygen ionic conductivity of the high-yttria content of the outer TBC layer 18, which in turn reduces the sintering rate of the layer 18.

Additionally, hafnium oxide is insoluble in CMAS and, in amounts of greater than 0.5 weight percent and more preferably greater than 1.0 weight percent, hafnium oxide is believed to serve as a nucleating agent for the precipitation of a protective reaction product that contains calcium yttrium silicate (often known as an apatite phase) and potentially other reaction products resulting from the interaction of the high-yttria outer TBC layer 18 with CMAS deposits. Hafnium oxide particles can also serve to mitigate glass formation of CMAS by catalyzing the precipitation of crystalline CMAS, for example, crystalline calcium hafnate, which is less harmful than amorphous CMAS in the TBC system 10. For these reasons, it is desirable to incorporate hafnium oxide into the yttria-zirconia TBC system 10, and as such hafnium oxide incorporation is believed to be integral to preferred embodiments of the present invention. However, the hafnium oxide content in either TBC layer 16 or 18 is preferably less than its yttria content on a weight percent basis. Furthermore, because hafnium oxide is a heavier and larger molecule than yttria and zirconia, the hafnium content of the TBC system 10 is preferably not more than what is necessary to obtain its desirable effects. Hafnium oxide contents of about 1.3 weight percent in the high-yttria (about 38 weight percent) outer TBC layer 18 has been shown to confer significant improvements in terms of reducing spallation. On this basis, it was concluded that the above-noted benefits should be attainable by including hafnium oxide in amounts ranging from greater than 0.5 up to about 10 weight percent, and more preferably greater than 1.0 up to about 2.5 weight percent.

As an additional and optional feature of the invention, up to 10 weight percent of tantalum oxide ($Ta_2O_5$; tantala) may be incorporated into at least the outer TBC layer 18. The addition of tantalum oxide is preferably in addition to hafnium oxide (tantalum oxide replacing zirconium oxide), though it is foreseeable that tantalum oxide could be included to partially or even entirely replace hafnium oxide in the TBC system 10. Similar to the effects of adding hafnium oxide to the TBC system 10, tantalum oxide is believed to precipitate a crystalline calcium tantalate phase that is beneficial to inhibit the infiltration of remaining CMAS into the TBC system 10 and increase the melting point of the surrounding CMAS.

While the invention has been described in terms of specific embodiments, it is apparent that other forms could be adopted by one skilled in the art. Therefore, the scope of the invention is to be limited only by the following claims.

The invention claimed is:

1. A coating system on a surface region of a component, the coating system comprising:
   a bond coat; and
   inner and outer ceramic layers on the bond coat, the inner ceramic layer overlying the bond coat, the inner ceramic layer consisting of zirconia stabilized by about 6 to about 9 weight percent yttria, the inner ceramic layer having a thickness and a porosity level, the outer ceramic layer overlying and contacting the inner ceramic layer and defining an outermost surface of the coating system, the outer ceramic layer consisting of zirconia stabilized by about 25 to about 75 weight percent yttria and greater than 0.5 to 10 weight percent hafnium oxide and optionally 1 to 10 weight percent tantalum oxide, the outer ceramic layer having a thickness that is less than the thickness of the inner ceramic layer and, having a porosity level that is lower than the porosity level of the inner ceramic layer, and
   wherein the inner and outer ceramic layers are heat treated in a vacuum to a temperature and for a duration sufficient to relieve stresses therein.

2. The coating system according to claim 1, wherein the outer ceramic layer contains greater than 1.0 to 10 weight percent hafnium oxide.

3. The coating system according to claim 1, wherein the outer ceramic layer contains greater than 1.0 to 2.5 weight percent hafnium oxide.

4. The coating system according to claim 1, wherein the inner ceramic layer has a thickness of at least 50 to about 500 micrometers and the outer ceramic layer has a thickness of up to 250 micrometers.

5. The coating system according to claim 1, wherein the outer ceramic layer has a thickness of at least about 25 micrometers.

6. The coating system according to claim 1, wherein the ratio of the thickness of the outer ceramic layer to that of the inner ceramic layer is not greater than 0.5.

7. The coating system according to claim 1, wherein the porosity level of the inner ceramic layer is about 10 to about 25 volume percent and the porosity level of the outer ceramic layer is about 3 to about 15 volume percent.

8. The coating system according to claim 1, wherein the zirconia of the outer ceramic layer is stabilized by about 36 to 42 weight percent yttria and the outer and inner ceramic layers define a thickness ratio of not greater than 0.5.

9. The coating system according to claim 1, wherein the outer ceramic layer comprises a cubic crystal phase and the inner ceramic layer consists essentially of a tetragonal or modified tetragonal crystal phase.

10. The coating system according to claim 1, wherein the outer ceramic layer reacts with a eutectic compound containing calcia, magnesia, alumina and silica to form calcium yttrium silicate at temperatures above 1200° C.

11. The coating system according to claim 10, wherein the component is chosen from the group consisting of high and low pressure turbine vanes and blades, shrouds, combustor liners and augmentor hardware of a gas turbine engine.

12. The coating system according to claim 1, wherein the bond coat is a metallic bond coat chosen from the group consisting of MCrAlX overlay coatings and/or diffusion aluminide coatings.

13. The coating system according to claim 1, wherein the component is a gas turbine engine component formed of a nickel-base or cobalt-base superalloy.

* * * * *